United States Patent
Knoll et al.

(10) Patent No.: US 6,380,515 B1
(45) Date of Patent: Apr. 30, 2002

(54) WELDING TORCH WITH INVERSE EXTRACTION

(75) Inventors: Bastiaan Knoll, Naaldwijk; Andreas Mattheus Maria Moons, Waddinxveen, both of (NL)

(73) Assignee: Nederlandse Organisatie Voor Toegepast-Natuurwetenschappelijk Onderzoek Tno, Rijswijk (NL)

( * ) Notice: Subject to any disclaimer, the term of this patent is extended or adjusted under 35 U.S.C. 154(b) by 0 days.

(21) Appl. No.: 09/646,437

(22) PCT Filed: Mar. 9, 1999

(86) PCT No.: PCT/NL99/00126

§ 371 Date: Sep. 18, 2001

§ 102(e) Date: Sep. 18, 2001

(87) PCT Pub. No.: WO99/47302

PCT Pub. Date: Sep. 23, 1999

(30) Foreign Application Priority Data

Mar. 18, 1998 (NL) .............................................. 1008631

(51) Int. Cl.[7] .............................................. B23K 9/173
(52) U.S. Cl. ..................... 219/137.41; 219/74
(58) Field of Search ........................... 219/137.41, 136, 219/74, 75

(56) References Cited

U.S. PATENT DOCUMENTS 3,471,675 A * 10/1969 Sargent et al. ................ 219/75
3,514,567 A * 5/1970 Strang .................... 219/137.41
4,016,398 A 4/1977 Herrick

FOREIGN PATENT DOCUMENTS

WO    WO 91/07249    5/1991

* cited by examiner

*Primary Examiner*—Clifford C. Shaw
(74) *Attorney, Agent, or Firm*—Needle & Rosenberg, Esq.

(57) ABSTRACT

The present invention relates to a device for performing welding operations, comprising: a core member in which can be guided a welding wire connectable to a voltage source; an extraction member arranged on the outside of the core member for extracting substances inconvenient to the welder; a gas supply member arranged on the outside of the extraction member for supplying gas. The invention also relates to an assembly for welding a weldment, comprising: a device as claimed in any of the claims 1–9, welding wire supply means for supplying welding wire; gas supply means for supplying gas via the gas supply member; a voltage source for applying electrical voltage between the welding wire and the weldment; pumping means for exhausting substances inconvenient to the welder via the extraction member.

11 Claims, 4 Drawing Sheets

WELDING TORCH WITH INVERSE EXTRACTION

The present invention relates to a device, assembly and method for performing welding operations, wherein substances inconvenient to the welder are extracted.

Welding is generally the connecting of metals by means of heat and/or pressure, with or without the addition of similar material with the same melting range. In fusion welding the objects for welding are mutually connected by fusing of the material in the vicinity of the welding joint without pressure being exerted on the objects. The welding joint is filled with a metal which is supplied in wire or rod form. An important known fusion welding method is arc welding, wherein an electrical arc is used to fuse the edges of the welding joint and the supplied metal. In gas shielded arc welding, reactions of the melting bath with the outside air are prevented by enclosing the bath in a protective atmosphere.

The weld fume released during welding, consisting inter alia of gas supplied during the welding, by evaporation and condensation and by weld particles and welding gases and the like resulting from spatters, contains substances which can be irritating or even harmful to the health of the welder. Particularly in the case of frequent and prolonged welding, the quantity of harmful or irritating substance taken in by the welder is undesirably large.

Welding devices are known wherein just above the welding joint of the weldment for welding an extractor unit is placed which extracts the greater part of the weld fume. The drawbacks of such an extraction unit are that it is only effective when it is placed close to the welding device and that it is quite bulky. Certainly in the case of larger weldments, wherein a welding joint of great length must be made or welding must take place at large mutual distances, such an extractor unit is less effective. Such an extractor unit must moreover co-displace with the welding device via a mobile, rotatable, pivotable or slidable frame, which considerably reduces the mobility of the welder.

A weld fume dispelling device is also known which is arranged on the body of the welder and which blows away the weld fume directly in front of the face of the welder. The drawbacks of such weld fume dispelling devices are, among others, the limitation in the freedom of movement of the welder in that an apparatus is fixed to the body of the welder and the fact that, while the weld fume is dispelled, it nevertheless remains in the welding area in which the welder is carrying out his activities which, certainly in poorly ventilated welding areas, can result in too high weld fume concentrations.

Welding guns are also known wherein around a contact tube through which the welding wire required for the welding is supplied a gas feed is arranged for supplying shielding gases and wherein around the shielding gas feed an outlet is realized which attempts to discharge the substances inconvenient to the welder before they have reached the welder.

The drawback of such a welding gun is that the extraction force must be limited so as not to adversely affect the shielding gas, so that substances which are damaging to health or irritating are not sufficiently discharged and therefore reach the welder in large quantities.

The object of the invention is therefore to provide a device wherein the stated drawback is obviated. The present device provides for this purpose a device for performing welding operations, comprising:

a core member in which can be guided a welding wire connectable to a voltage source;

an extraction member arranged on the outside of the core member for extracting substances inconvenient to the welder;

a gas supply member arranged on the outside of the extraction member for supplying gas.

By so adapting the placing of the outlet, i.e. directly around the contact tube or core member, the protective gas arc on the one hand remains present round the welder, whereby oxidation and the like continues to be prevented, and on the other hand substances inconvenient to the welder are extracted in improved manner. The quantity of inconvenient substances actually reaching the welder will hereby be greatly reduced, which results in a greatly reduced effect on the health of the welder.

According to preferred embodiments of the invention the core member has a substantially elongate form, the extraction member is arranged substantially around the longitudinal side of the core member and the gas supply member is arranged substantially around the longitudinal side of the extraction member. This results in an elongate welding gun which is easily grasped and operated by a welder.

In a further embodiment the extraction member is a tube in which the outer casing is arranged substantially concentrically relative to the core member.

In a further embodiment of the invention the gas supply member is formed by at least one tube member arranged against the outer wall of the extraction member. This results in an easily and well manageable construction with which the objective of the invention can be achieved.

According to a further embodiment the gas supply member is formed by a tube arranged substantially concentrically relative to the core member and around the outer wall of the extraction member. By embodying the gas supply member and the extraction member as concentric tubes around the core member a simple construction is obtained with which the substances inconvenient to the welder are discharged in uniform manner, i.e. over the whole inner surface of the shielding welding arc. In a further embodiment of the invention the extraction member is formed by at least one extraction tube arranged against the outside of the core member and the gas supply member by a tube, the outer casing of which is arranged substantially concentrically relative to the core member.

The present invention also provides an assembly for welding a weldment which comprises the above described device, welding wire supply means for supplying welding wire, gas supply means for adding gas via the gas supply member, a voltage source for applying an electrical voltage between the welding wire and the weldment and pumping means for exhausting substances inconvenient to the welder via the extraction member.

The invention also provides a method for performing welding operations with the above described device or the above described assembly.

The preferred embodiments of the present invention will be described hereinbelow with reference to the drawings, in which:

FIG. 2b shows a lengthwise section through the known welding gun of FIG. 2a;

FIG. 3b shows a lengthwise section through the preferred embodiment of FIG. 3a;

Figure 1:
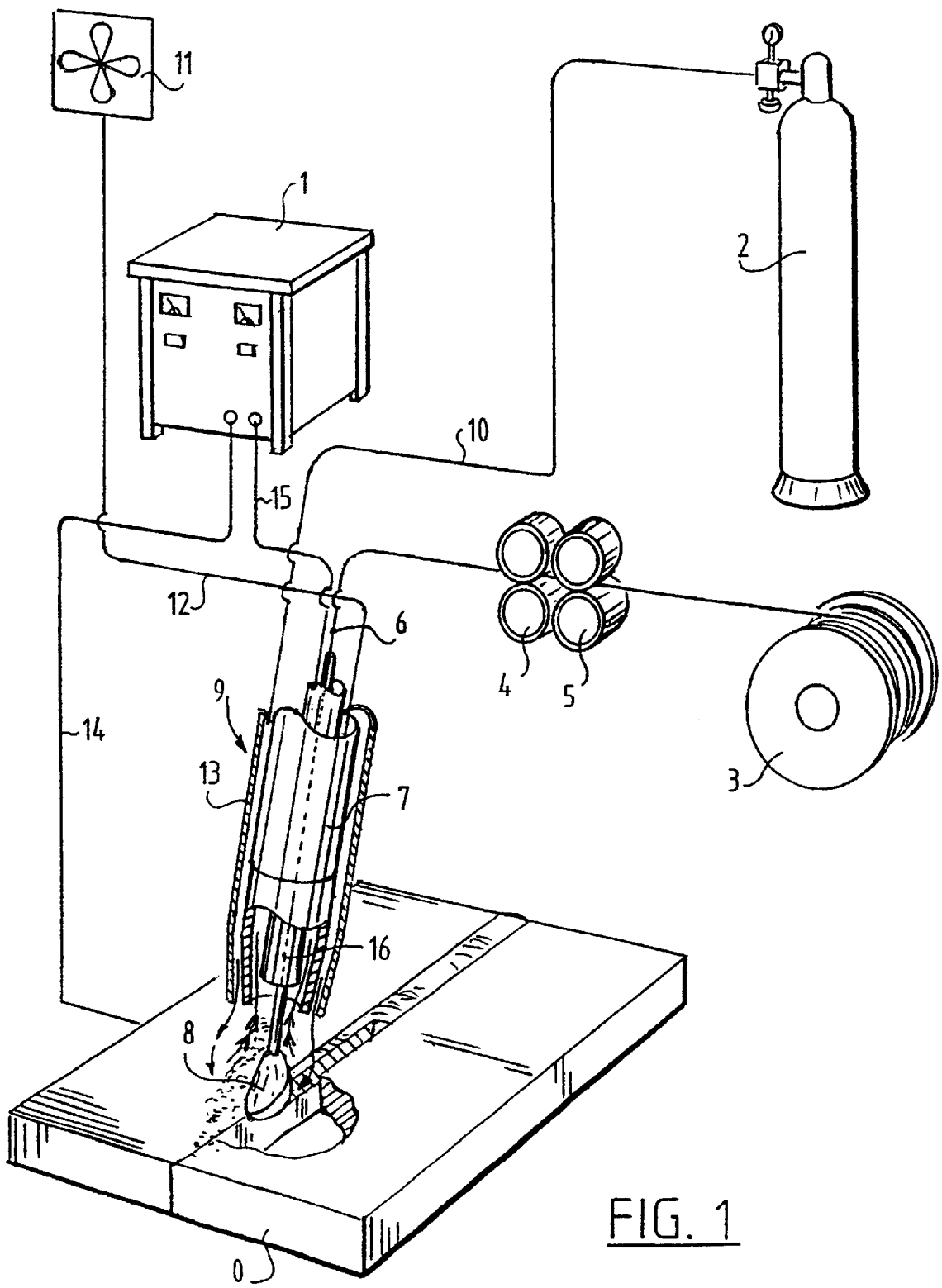
FIG. 1 shows a view of a preferred embodiment of an assembly according to the present invention.

The welding arrangement shown in FIG. 1 comprises a power source 1 which is connected via a connecting wire 14 to the object for welding O and is connected via a connecting wire 15 to contact tube 16 in welding gun 9. Welding wire 6 is stored on a reel 3 and is unwound and pushed through contact tube 16 via a drive and pressure roller pair 4 and 5. When welding wire 16 makes contact with the object for welding O, a current will flow via connecting wire 15, contact tube 16, welding wire 6, the object for welding O and connecting wire 14. Heat is generated by this current with which the welding process is initiated. In the shown embodiment the contact tube is substantially cylindrical and the outer casing 7 of the fume gas outlet is arranged concentrically round contact tube 16 and an outer casing 13 of the shielding gas feed is disposed concentrically round outer casing 7 of the outlet.

In order to prevent oxidation of the welded joint, gas is supplied from gas bottle 2 via gas conduit 10 and via the gas feed between outer casing 13 and outer casing 7 of welding gun 9. By placing the feed openings for the shielding gas around the outlet a uniform welding arc is created. The outlet formed by the intermediate space between contact tube 16 and outer casing 7 is connected via discharge conduit 12 to an extractor fan 11. The harmful substances are hereby extracted uniformly around contact tube 16 of welding gun 9.

The foremost portion of welding gun 9 is heated by both the current transfer and by the heat radiation from welding arc 8. In an embodiment which is not shown liquid cooling can be applied for cooling of a welding gun. In liquid-cooled welding guns the nozzle of the welding gun is cooled by a cooling liquid which is circulated through a cooling circuit of the welding device.

Figure 2A:
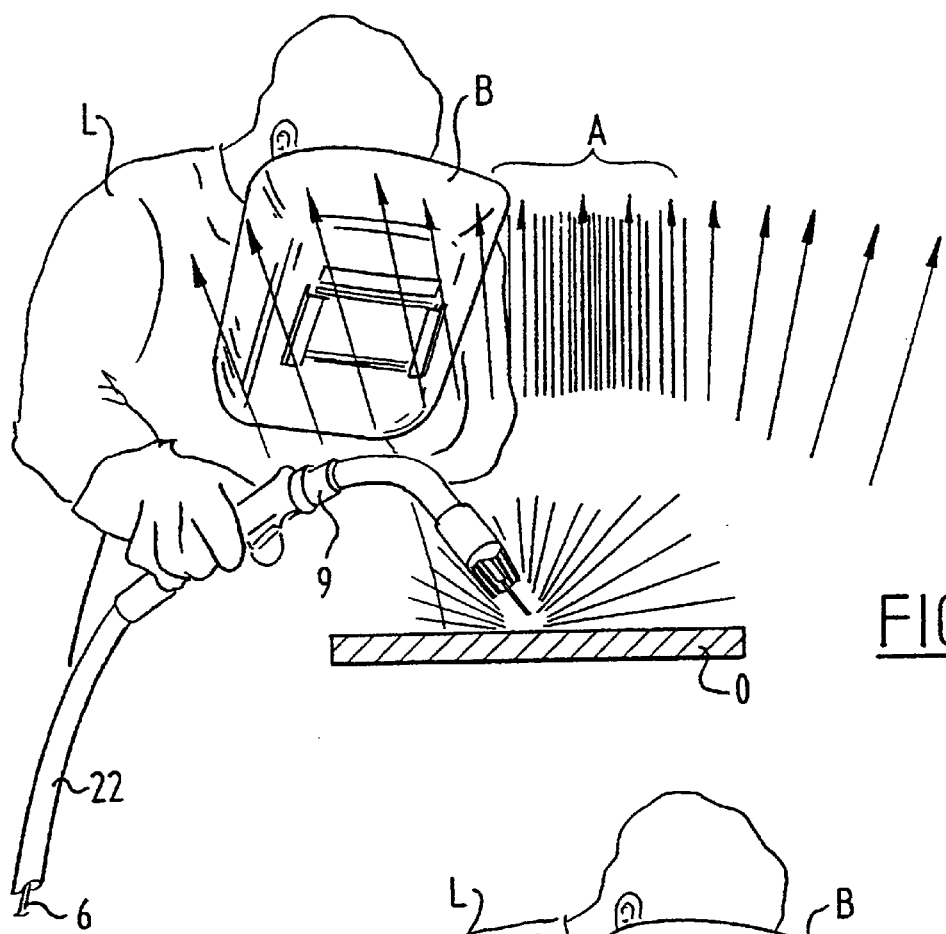
FIG. 2a shows a view of a known welding arrangement with welder.

FIG. 2a shows a welder L performing welding operations on an object for welding O. Welder L holds in the one hand welding gun 9 and in the other a welding shield B which, in addition to protecting the eyes and face of welder L, also has the purpose of deflecting away from the face of welder L a part of the weld fume created during welding. Welding shield B can also be fastened to the head of the welder.

Welding wire 6 is pushed via hose package 22 into welding gun 9 and makes contact on its outer end with the object for welding O. Due to the generation of heat resulting from the current flowing through welding wire 6 and object for welding O a metal vapour is created from the droplets and the melting bath which have a temperature of between 3000° C. and 6000° C. The metal vapour cools again after possible reaction with air to form particles in solid form with a diameter of between about several tens of micrometers and a few micrometers. Inhalation of such small particles, for instance chromium particles during welding of alloys, can be very damaging to the health of welder L since these particles penetrate very deeply into the lungs of welder L and there adversely affect the function of the alveoli.

Without extraction of the weld fume, i.e. the gas with said metal particles, the situation shown in FIG. 2a occurs in which the arrows indicate how the gas with metal particles is disseminated. The greater part thereof finishes up in the zone designated A, i.e. directly above the welding position, but a considerable portion still also reaches welder L.

Figure 2B:
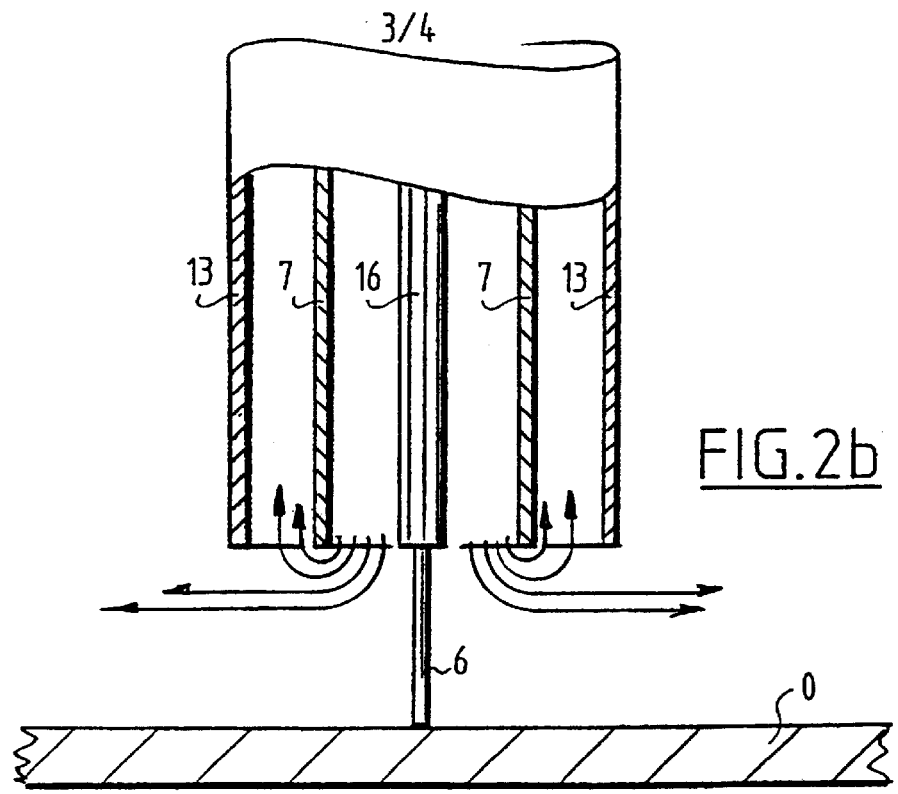

While by embodying welding gun 9 in known manner as shown in FIG. 2b, thus with a gas feed around contact tube 16 and a fume gas outlet around the outer casing 7 of the gas feed, a large portion of the produced weld fume is discharged, this will relate specifically to the weld fume which would finish up in zone A. The weld fume most relevant for welder L, i.e. the weld fume which reaches his head, is not discharged, or hardly so, whereby the health-damaging effects will persist.

In the known welding gun with extraction 90% of the shielding gases is thus extracted, but the remaining 10% determines the total exposure of welder L to the harmful substances. The exposure is only reduced for instance by a maximum of 20%.

Figure 3A:
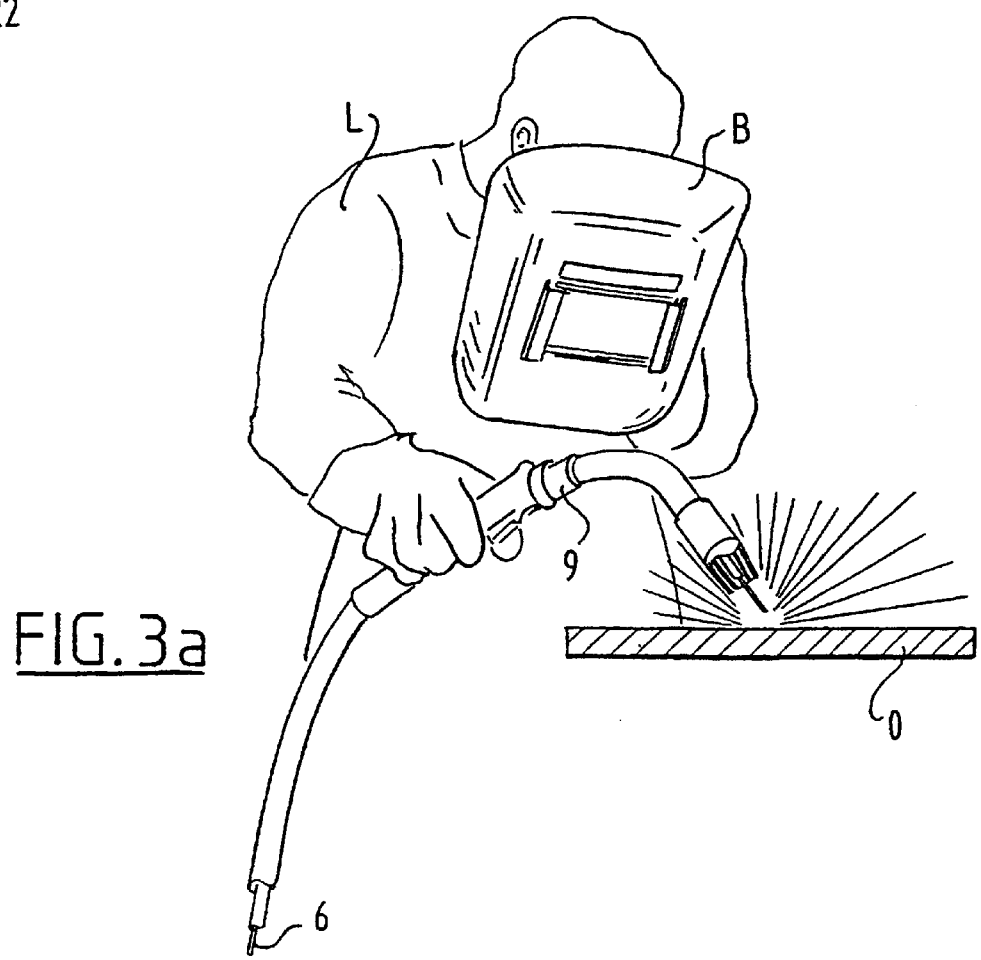
FIG. 3a shows a view of a welding arrangement and welder according to a preferred embodiment of the present invention.
Figure 3B:
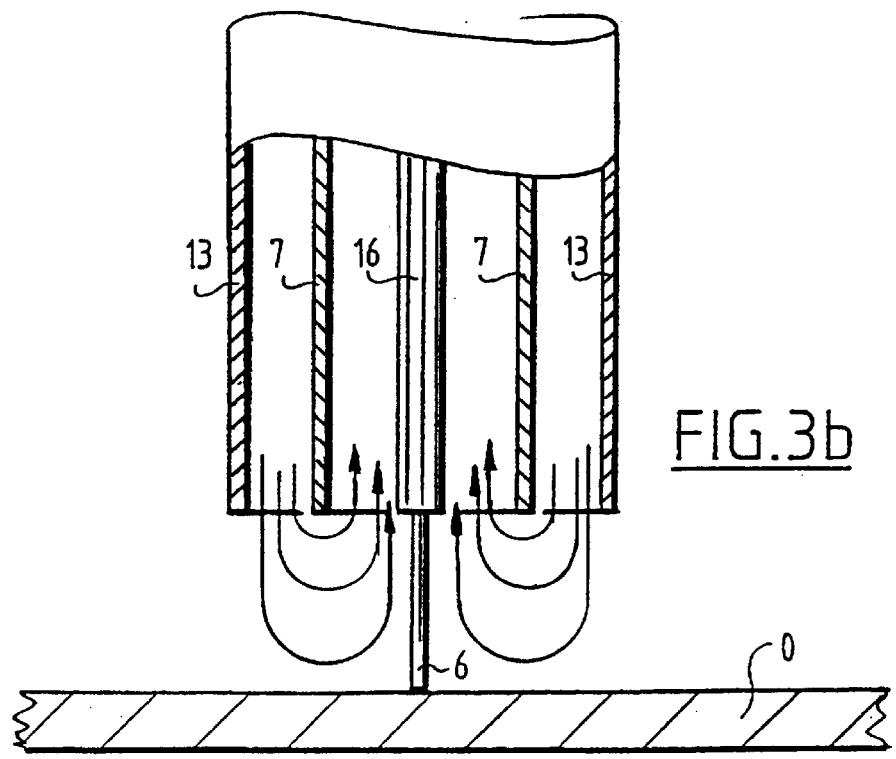

By embodying welding gun 9 as shown in the preferred embodiment of the invention in FIG. 3b, i.e. with a fume gas discharge around contact tube 16 and with a shielding gas feed around outer casing 7 of the outlet, a discharge of weld fume damaging to health is realized which is considerably better for welder L. FIG. 3a shows that not only is much less weld fume finally disseminated but that more weld fume is also discharged in the zone relevant for welder L. A larger portion of the undesired substances is extracted since the shielding gases arriving via the gas feed and the released particles are discharged directly via the outlet. This not only means that a larger part of the weld fume is extracted from the environment but also that precisely that portion of the weld fume which most determines the total exposure of the welder is discharged.

Figure 4A:
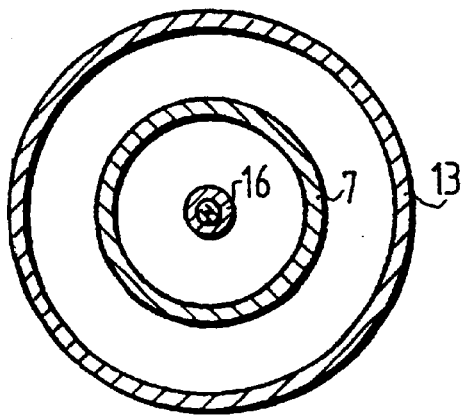
FIG. 4a shows a cross-section through the welding gun of the embodiment of FIG. 3.

FIG. 4a shows a cross-section through welding gun 9 of the embodiment of the invention described up to this point, wherein contact tube 16 has a substantially cylindrical section around which outer casing 7 of the outlet for undesirable substances is arranged concentrically and wherein outer casing 13 of the feed for shielding gas is arranged concentrically round outer casing 7.

Figure 4B:
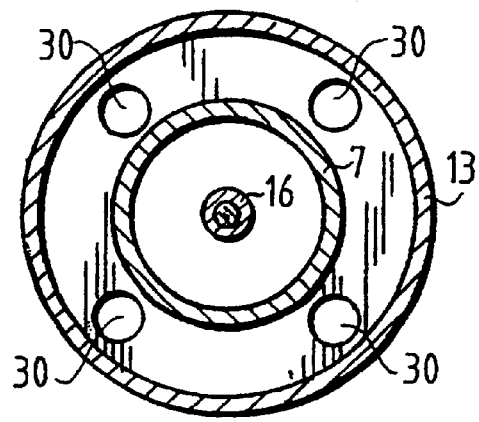
FIG. 4b shows a cross-section through the welding gun in a further embodiment.

In FIG. 4b another embodiment is described in which four outlet openings 30 are arranged on the outlet side of the gas feed, wherein the supply of shielding gas takes place through the four outlet openings 30. This has the advantage that the outflow speed of the shielding gases is increased. The possible adverse effect on the protective atmosphere by the extraction is then reduced.

Figure 4C:
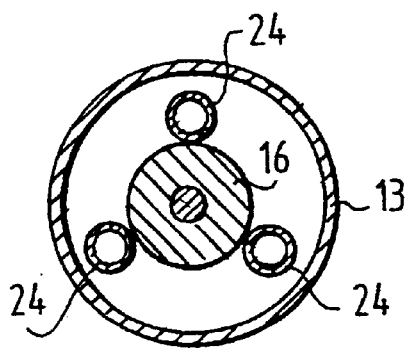
FIG. 4c shows a cross-section through the welding gun in a further embodiment.

In FIG. 4c a further embodiment is described in which is shown a contact tube 16 of circular cross-section with outer casing 13 of the gas feed placed concentrically therearound. Discharge takes place via three discharge members 24 which per se have a circular section and are arranged against contact tube 16.

Figure 4D:
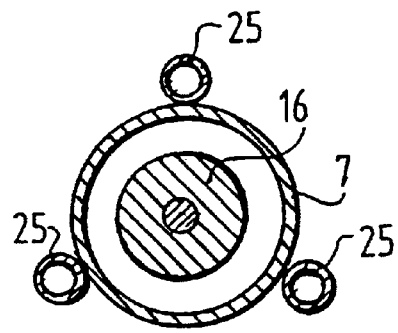
FIG. 4d shows a cross-section through the welding gun in a further embodiment.

In FIG. 4d a further embodiment is described in which contact tube 16 has a circular cross-section and an outer casing 7 of the outlet is situated concentrically around this contact tube, wherein the gas feed takes place through three feed tubes 25 placed on the outside against outer casing 7 of the outlet.

The present invention is not limited to the above described preferred embodiments thereof; the rights sought are defined in the first instance by the following claims, within the scope of which many modifications can be envisaged.

What is claimed is:

1. Assembly for welding a weldment, comprising:

welding wire supply means (4,5) for supplying welding wire (6);

gas supply means (2) for supplying gas;

a voltage source (1) for applying electrical voltage between the welding wire (6) and the weldment;

pumping means (11) for exhausting substances inconvenient to the welder;

device (9) for performing welding operations comprising:

a core member (16) in which can be guided the welding wire (6) connectable to voltage source (1);

an extraction member (7) connectible to the pumping means (11);

a gas supply member (13) for supplying gas from the gas supply means (2); characterized in that the extraction member (7) is arranged on the outside of the core member (16) and the gas supply member (13) is arranged on the outside of the extraction member (7).

2. Assembly as claimed in claim 1, wherein the core member (16) has a substantially elongate form.

3. Assembly as claimed in claim 2, wherein the extraction member is arranged substantially around the longitudinal side of the core member.

4. Assembly as claimed in claim 2, wherein the gas supply member is arranged substantially around the longitudinal side of the extraction member.

5. Assembly as claimed in claim 1, wherein the extraction member is an elongate tube, the outer casing of which is disposed substantially concentrically relative to the core member.

6. Assembly as claimed in claim 5, wherein the gas supply member is formed by at least one tube member arranged against the outer casing of the extraction member.

7. Assembly as claimed in claim 5, wherein the as supply member is formed by a tube arranged substantilly concentrically relative to the core member and round the outer casing of the extraction member.

8. Assembly as claimed in claim 7, wherein the gas supply member is provided with at least outlet openings on its outlet side.

9. Assembly as claimed in claim 1, wherein the extraction member is formed by at least one extraction tube arranged against the outside of the core member and the gas supply member by a tube, the outer casing of which is arranged substantially concentrically relative to the core member.

10. An apparatus, including a device for performing welding operation in an assembly according to claim 1, said apparatus also including an extraction member (7) arranged on the outside of a core member (16) of said device and a supply member (13) arranged on the outside of said extraction member (7).

11. Method for welding a weldment, comprising the steps of:

providing a core member connectable to a voltage source;

guiding a welding wire through said core member and extending from one end of said core member;

applying electrical voltage between the welding wire and the weldment;

supplying gas around said one end of said core member; and exhausting substances inconvenient to the welder through a channel located intermediate said core member and the supplied gas.

* * * * *